United States Patent
Wolff et al.

(10) Patent No.: US 7,228,565 B2
(45) Date of Patent: Jun. 5, 2007

(54) EVENT REPORTING BETWEEN A REPORTING COMPUTER AND A RECEIVING COMPUTER

(75) Inventors: Daniel Joseph Wolff, Aylesbury (GB); Lee Codel Lawson Tarbotton, Leicester (GB); Edward Moore, Aylesbury (GB)

(73) Assignee: McAfee, Inc., Santa Clara, CA (US)

( * ) Notice: Subject to any disclaimer, the term of this patent is extended or adjusted under 35 U.S.C. 154(b) by 733 days.

(21) Appl. No.: 09/854,492

(22) Filed: May 15, 2001

(65) Prior Publication Data

US 2002/0174358 A1 Nov. 21, 2002

(51) Int. Cl.
*G06F 11/30* (2006.01)
(52) U.S. Cl. .................................... 726/24; 713/188
(58) Field of Classification Search ............. 713/200, 713/188; 726/24
See application file for complete search history.

(56) References Cited

U.S. PATENT DOCUMENTS

| | | | | |
|---|---|---|---|---|
| 5,291,598 | A * | 3/1994 | Grundy | 726/28 |
| 5,960,170 | A * | 9/1999 | Chen et al. | 714/38 |
| 6,842,861 | B1 * | 1/2005 | Cox et al. | 713/188 |
| 2002/0138435 | A1 * | 9/2002 | Williams et al. | 705/51 |

OTHER PUBLICATIONS

"Symantec System Center Implmentation Guide", Jun. 30, 2000, pp. 1-87. <http://www.symantec.com/techsupp/enterprise/products/nav_ce/nav7-ce/manuals.html>.*

Menezes et al, "Handbook of Applied Cryptography", 1997, pp. 12, 15-16.*
Brown, Brain, "Data Communications," 1999, pp. 1-2.*
Graham, Ian, "URLs for HTTP Servers," Jan. 5, 1998, pp. 1-2 <http://www.utoronto.ca/webdocs/HTMLdocs/NewHTML/url_http.html>.*
Norton AntiVirus Corporate Edition, Implementation Guide, 2000, pp. 285-296.*

(Continued)

*Primary Examiner*—Emmanuel L. Moise
*Assistant Examiner*—Michael Pyzocha
(74) *Attorney, Agent, or Firm*—Zilka-Kotab, PC; Christopher J. Hamaty (57) ABSTRACT

An event report, such as a virus detection event, is sent from a reporting computer 2 to a receiving computer 6 via an internet link 4. The report data may take the form of a URL requesting a web page 28 to be provided by the receiving computer 6, the URL bearing an encrypted form 24 of the report data that is used to identify the requested web page as well as pass further information to the receiving computer 6. Alternatively, the report data may be collated in the reporting computer 2 and passed to the receiving computer 6 when a computer virus definition data update is requested. The report data seeks to uniquely identify the event by incorporating the MAC address of the reporting computer 2, the date, time, computer product identifier, version identifier, update identifier and driver triggered. Additionally, a checksum derived from the infected file together with an indication of the corrective action, if any, taken by the reporting computer 2 may be included. The report data sent to the receiving computer 6 may be used to obtain real life information concerning the prevalence of particular viruses together with information characterising the anti-virus programs and their update status being employed by the user community.

68 Claims, 7 Drawing Sheets

OTHER PUBLICATIONS

McAfee.com: Virus Information Library, Oct. 12, 1999, pp. 1-3. <http://web.archive.org/web/19991012210358/vil.mcafee.com/help.asp>.*

Symantec AntiVirus Research Center, Mar. 1, 2000, pp. 1-7. <http://web.archive.org/web/20000301031748/www.symantec.com/avcenter/vinfodb.html>.*

Computer Associates Vet Anti-Virus Software Home Page, Feb. 29, 2000, pp. 1-4. <http://web.archive.org/web/20000229183411/http://www.vet.com.au/index.html>.*

Trend Micro Delivers The First Free On-Line Virus Scanning Service, May 7, 1997, pp. 1-3. <http://www.trendmicro.com/en/about/news/pr/archive/1997/pr050797.htm>.*

"Search Help", http://web.archive.org/web/19991012210358/vil.mcafee.com/help.asp Feb. 22, 2007.

Untitled document, p. 1, date unknown.

"Virus Information Library", http://webarchive.org/web/19991127154729/vil.mcafee.com/alphar.asp?chat=%5b0-9%5d, Feb. 22, 2007.

* cited by examiner

| | | DAT / Driver Number | | | |
|---|---|---|---|---|---|
| Virus name | Sample # | 4120 | 4121 | 4122 | 4123 |
| KAK.JS | 1 | 91 | 200 | 200 | 200 |
| Kak | 2 | 140 | 210 | 210 | 210 |
| CAP | 3 | 4000 | 2000 | 2000 | 2000 |
| CAP.a | 4 | 4090 | 2090 | 2090 | 2400 |
| CAP.DAM | 5 | 4300 | 2300 | 2300 | 2800 |
| RIPPER | 6 | 2000 | 3000 | 3000 | 1000 |

Fig. 7

| Virus name | Sample # | Description | Irreparable damage | Date description last modified | Variant of | Min Dat | Min engine | ... | etc |
|---|---|---|---|---|---|---|---|---|---|
| KAK.JS | 1 | Blurb | N | | - | 4056 | 4050 | | |
| KaK | 2 | Blurb | N | | 1 | 4077 | 4070 | | |
| CAP | 3 | Blurb | N | | - | 4010 | 4002 | | |
| CAP.a | 4 | Blurb | N | | 3 | 4040 | 4035 | | |
| CAP.b | 50 | Blurb | N | | 3 | 4100 | 4050 | | |
| Wazzu | 88 | Blurb | Y | | - | 4090 | 4035 | | |

Fig. 8

| Mac Address | Date | Time | Product | Internal Version | Engine | DAT | Driver | Is duplicate |
|---|---|---|---|---|---|---|---|---|
| Af23ad4c6b | 12-Feb-01 | 23:34:56 | GSE | 4.5.1234 | 4120 | 4120 | 4000 | N |
| Af23ad4c6b | 13-Feb-01 | 18:23:32 | NNT | 4.5.6534 | 4140 | 4123 | 2300 | N |
| Af23ad4c6b | 12-Feb-01 | 23:34:56 | GSE | 4.5.1234 | 4120 | 4120 | 4000 | Y |
| 3b4cd2a36b | 13-Feb-01 | 15:23:12 | NNT | 4.5.6541 | 4120 | 4126 | 30000 | N |
| 3b4cd2a36b | 13-Feb-01 | 20:43:23 | NNT | 4.5.6541 | 4120 | 4126 | 2350 | N |
| A1b2c3d45f | 02-Feb-01 | 14:23:12 | Vsc | 4.0.3234 | 4070 | 4100 | 200 | N |

Fig. 9

EVENT REPORTING BETWEEN A REPORTING COMPUTER AND A RECEIVING COMPUTER

BACKGROUND OF THE INVENTION

1. Field of the Invention

This invention relates to the field of data processing systems. More particularly, this invention relates to event reporting between a reporting computer and a receiving computer, such as, for example, reporting the detection of a computer virus to an antivirus software provider.

2. Description of the Prior Art

It is known to provide anti-virus computer programs that act to detect computer viruses and, if required, disinfect/clean/quarantine/delete infected files. When a computer virus is detected, the known systems may generate a virus detection report that is displayed to a user to inform them of the detection event. The user may at this time be given the option of accessing a description of the nature and action of the detected computer virus with that description either being stored locally or remotely. The generation of such descriptive information is labour intensive and expensive. With many tens of thousands of known computer viruses it is difficult to determine accurately which are the common computer viruses upon which users are requesting information in order that the resources for providing such information may be concentrated on these requests.

A further problem in the anti-virus field is obtaining an accurate picture of which viruses are at any time prevalent in the user community as well as obtaining an accurate picture of what anti-virus program tools with their different versions and update states are being used to counter these virus threats.

SUMMARY OF THE INVENTION

Viewed from one aspect the present invention provides a computer program product comprising a computer program operable to control a reporting computer to report occurrence of an event to a receiving computer, said computer program comprising:

report generating logic operable to generate report data identifying said reporting computer and said event;

data retrieving logic operable to fetch requested data from said receiving computer to said reporting computer upon a request of said reporting computer; and report sending logic operable to send said report data from said reporting computer to said receiving computer upon fetching of said requested data.

The invention recognises that a report identifying a particular event and a computer upon which that event occurs may be passed to a receiving computer in combination with a request for data made from the reporting computer to the receiving computer in the course of other operation. Thus, the report can be made without having to establish a dedicated reporting communication session and without requiring a user to take any actions dedicated to triggering such a report. Rather, in the normal process of requesting data that is needed for other purposes, the reporting data may be passed on to the receiving computer at the same time.

It will be appreciated that the events being detected and reported could take a wide variety of forms. As an example, system malfunctions could be the subject of report data that was reported back to a system provider effectively "piggy backing" on a request for other data from that system provider.

Whilst the technique of the invention could be used in a wide variety of situations, it is particularly useful when the events being reported are the detection of computer viruses. The need to collect such data is high.

The requested data could take a variety of forms, but particularly preferred forms are when the requested data is a description, such as a web page, of the event being reported or when the requested data is an update to a set of data used in detecting such events.

A particularly efficient way of passing the report data is to create an internet URL in which the report data is embedded, preferably in an encrypted form to resist tampering, with the receiving computer using the URL to trigger return of appropriate requested data as well as retrieving the report data from the URL.

In another set of embodiments, the report data may be locally collected by the reporting computer and then sent together as a collated report to the receiving computer at a later time.

The internet provides a particularly convenient link between the reporting computer and the receiving computer that may be used to transfer the report data and the requested data.

The report data could include many different data fields. Particularly advantageous data fields to be included within the report data include a MAC address that can be used to uniquely identify the reporting computer (a MAC address is practically unique, but it is possible to have duplicates and some network cards allow modification of the MAC address), date and time information, information identifying a computer program, version and update status of the computer program used to detect the event, data indicating the type of response that may have occurred on the reporting computer when the event was detected and possibly a checksum for verifying the identity of a computer file that may have triggered the event.

A complementary aspect of the invention is provided by a computer program product comprising a computer program operable to control a receiving computer to receive a report of occurrence of an event from a reporting computer, said computer program comprising:

data request receiving logic operable to receive a request for requested data from said reporting computer;

data providing logic operable to provide said requested data to said reporting computer; and report receiving logic operable to receive report data identifying said reporting computer and said event from said reporting computer upon providing of said requested data to said reporting computer.

The invention also provides a method for operating a reporting computer and a receiving computer in accordance with the above techniques as well as a reporting computer and a receiving computer operating in accordance with the above techniques.

Embodiments of the invention will now be described, by way of example only, but with reference to the accompanying drawings in which:

DESCRIPTION OF THE PREFERRED EMBODIMENTS

Figure 1:
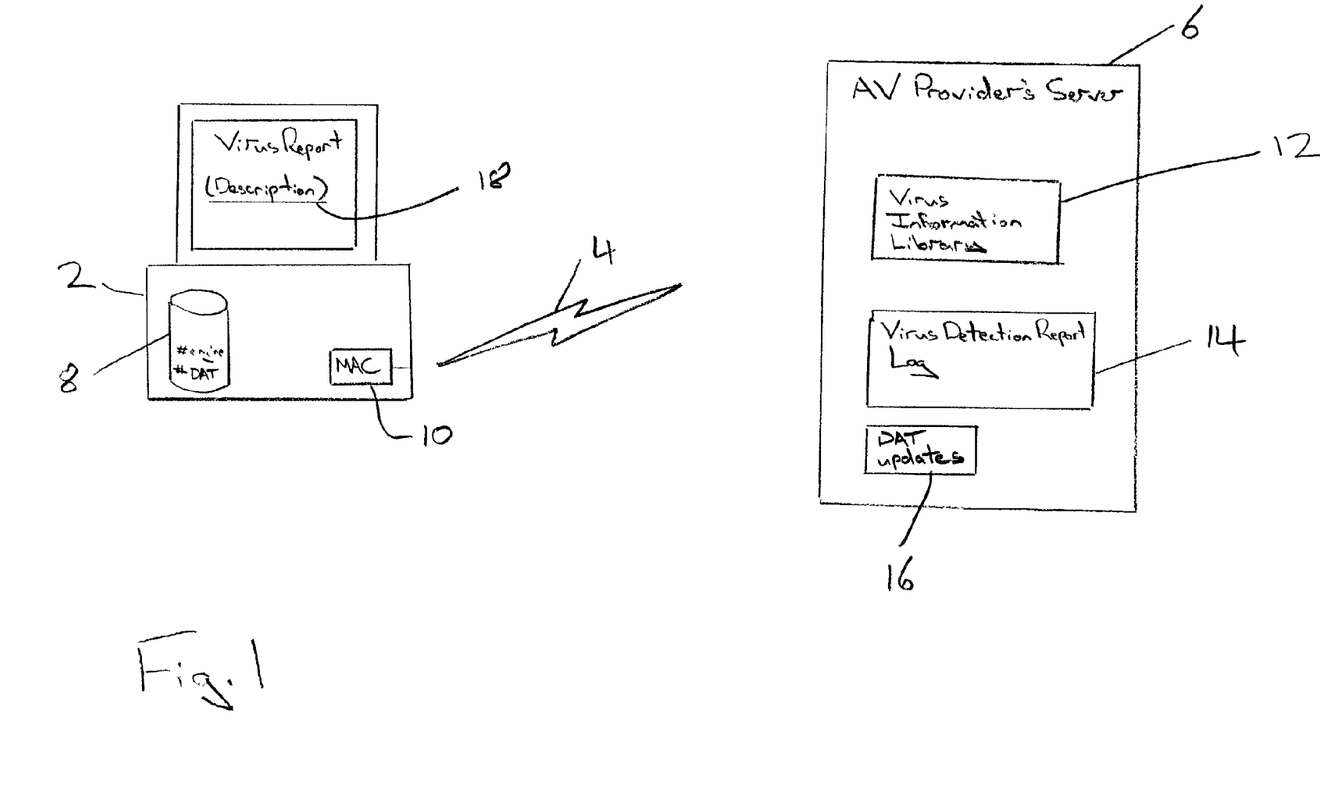
FIG. 1 schematically illustrates a reporting computer and a receiving computer.

FIG. 1 illustrates a reporting computer 2 connected via an internet link 4 to a receiving computer 6. The reporting computer 2 is a user's PC running anti computer virus software stored upon a hard disc drive 8. A network card 10 having a unique MAC address connects the reporting computer to the receiving computer 6. The anti-virus software is made up of an anti-virus computer program engine having a particular version number that operates using a set of virus definition data having a particular update status.

The receiving computer 6 is the web server of an anti-virus provider. This web server includes a virus information library 12 comprising a collection of web pages that may be viewed by users to give a description of the nature and action of various computer viruses. A virus detection report log 14 within the receiving computer logs detection reports received from users. These detection reports may then be used to generate information regarding the real life prevalence of particular viruses, requests for information and the real life program versions and update status of users. The receiving computer 6 also includes virus definition data updates 16 that may be downloaded by users either on-demand or as part of a regular scheduled update process.

When the reporting computer 2 detects a computer virus, either as a result of on-access scanning or on-demand scanning, a virus detection report is generated and displayed to the user. This virus detection report includes a hypertext link 18 upon which the user may click if they wish to view a description of the virus that has been detected. This description is retrieved from the virus information library 12. The URL used to access to relevant page within the virus information library 12 upon activation of the hypertext link 18 also carries information uniquely identifying the reporting computer and the virus detection event.

Figure 2:
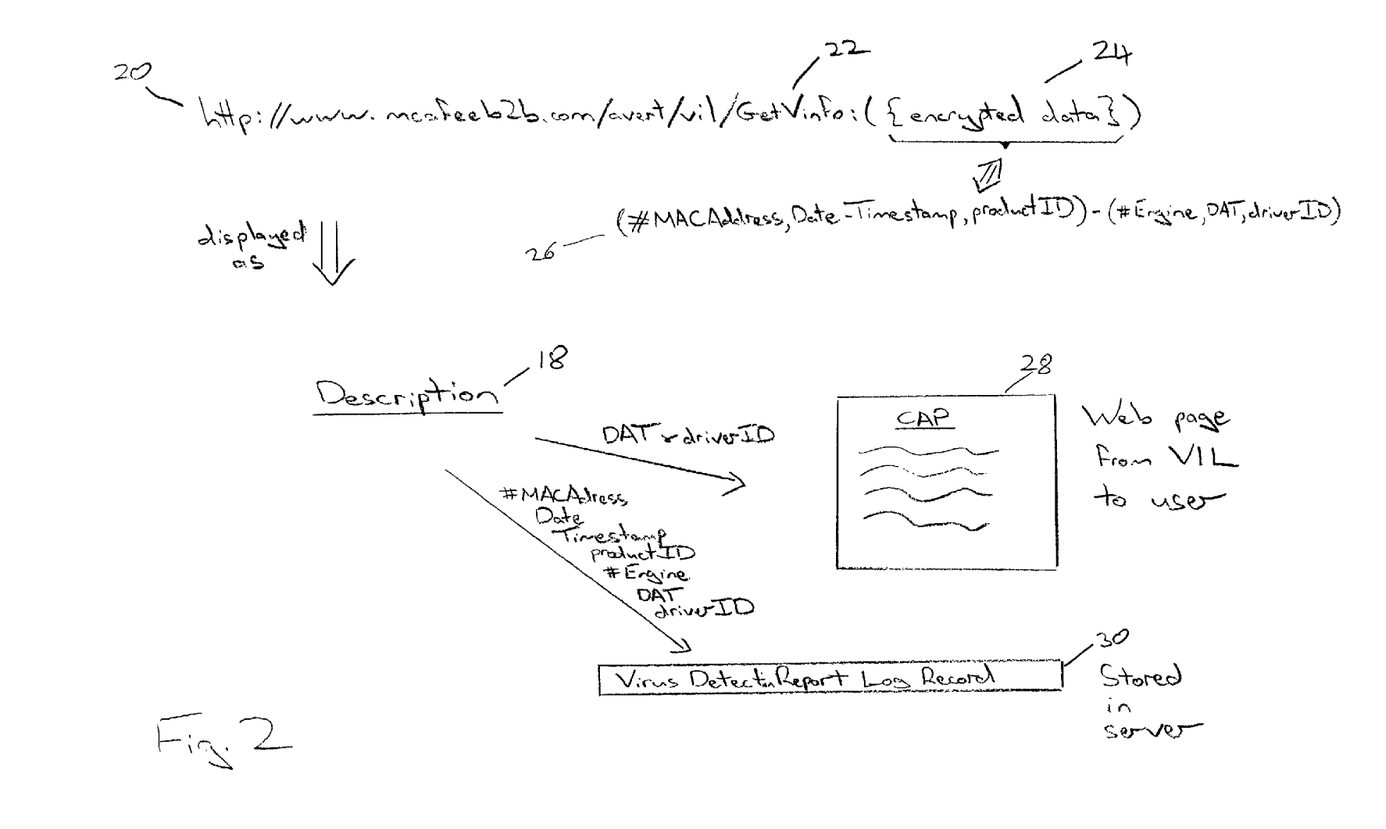
FIG. 2 illustrates the use of a URL to access requested data and to pass report data.

FIG. 2 illustrates the URL described above in more detail. In particular, the URL 20 includes the name of a script 22 running on the receiving computer 6 that takes encrypted data 24 passed within the URL 20 and uses this to recover reporting computer and event identifying data 26.

The encrypted data 24 is generated by the reporting computer 2 using known encryption techniques. The receiving computer 6 has a complimentary decryption key that enables it to recover the report data 26 from the encrypted data 24. The report data 26 includes the MAC address of the network card 10 of the reporting computer 2, the date and time at which the virus was detected, an identifier of the virus detection program used, an identifier of the anti-virus engine within that program, an identifier of the virus definition data current within that program together with an identifier of the particular driver of that was triggered by the virus file (the driver identifier may be mapped to the identity of the virus).

The URL 20 is not displayed on the reporting computer 2 but instead is effectively hidden behind a hypertext link 18 that invites the user to click upon it in order to see a description of the virus. When the user clicks upon the hypertext link 18, the URL request 20 is passed to the receiving computer 6. The receiving computer 6 uses the update number of the virus definition data together with the driver triggered data to identify the particular web page describing the virus concerned within the virus information library 12 and returns this web page 28 to be displayed upon the reporting computer 2. The receiving computer 6, also uses the report data 26 passed to it to generate a virus detection report log record 30 within a database of such records. This record may include the MAC address, the date, the time, the product identifier, the engine identifier, the virus definition data identifier and the driver triggered identifier as well as other information, such as the nature of the corrective action taken by the reporting computer (such as cleaning, quarantining or ignoring) as well as a checksum value for the file within which the virus was detected in order to assist in eliminating multiple reports of detection of the virus within the same file.

The database of records obtained by the receiving computer 6 in this way may be used to provide real life information regarding the prevalence of particular viruses in the user community together with real life information regarding the set up of those users antivirus systems. The frequency at which information describing a particular virus, such as the web page information 28, is requested may be used to prioritise the generation of such descriptive data to be added to the virus information library 12.

Figure 3:
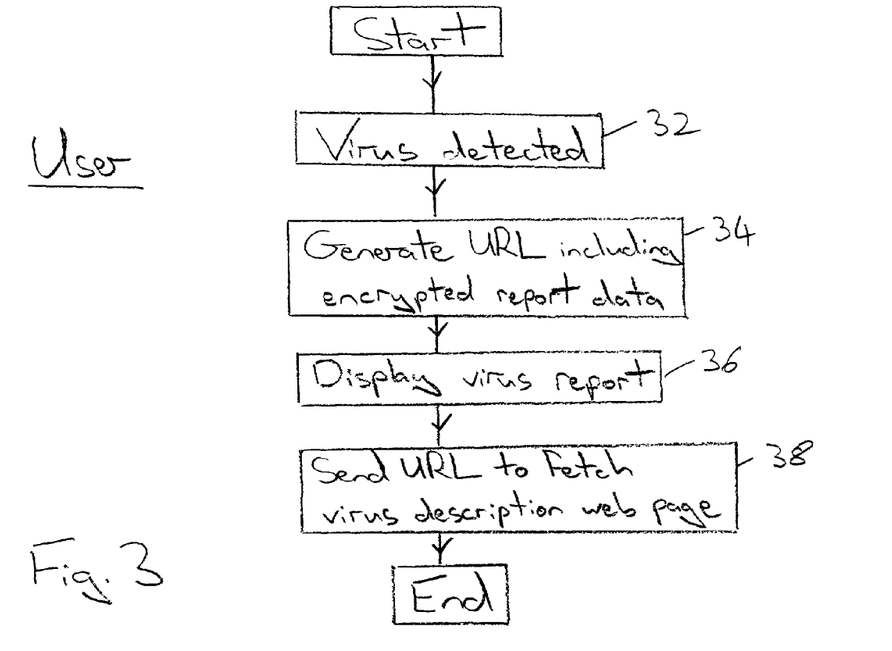
FIGS. 3 and 4 are flow diagrams respectively illustrating the operation of a reporting computer and a receiving computer in accordance with a first embodiment.

FIG. 3 illustrates the operation of a reporting computer 2 in accordance with a first embodiment. At step 32 a virus is detected. At step 34 a URL unique to that computer and the detected virus event is generated, the reporting data being encrypted within the URL. At step 36 the virus report is displayed to the user. If the user clicks upon the hypertext link for more information regarding the virus detected, then step 38 sends the URL to the receiving computer 6 and fetches the relevant virus description web page 28.

Figure 4:
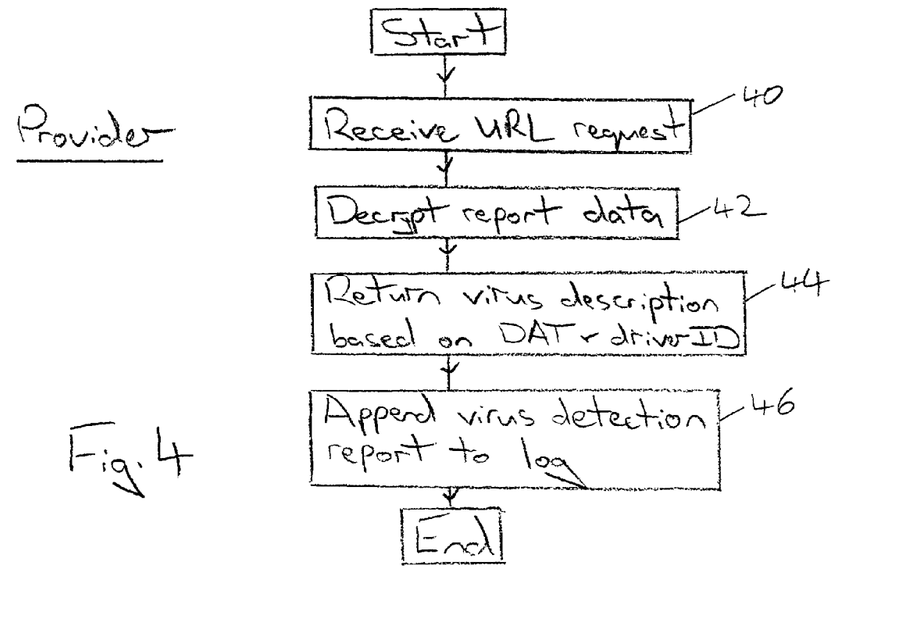

FIG. 4 illustrates the operation of a receiving computer in accordance with the first embodiment. At step 40 a URL request (as generated at step 38) is received. At step 42 the report data 26 embedded within the URL 20 is decrypted. At step 44 the virus description web page 28 is returned to the reporting computer 2 based upon the driver identifier and virus definition data identifier information recovered from the encrypted data 24. At step 46 the new virus detection report data 30 is appended to the database of such data held within the receiving computer 6. The request for the virus information may also be logged in order to identify the data being frequently requested by users in order that resources can then be focused on generating this data.

Figure 5:
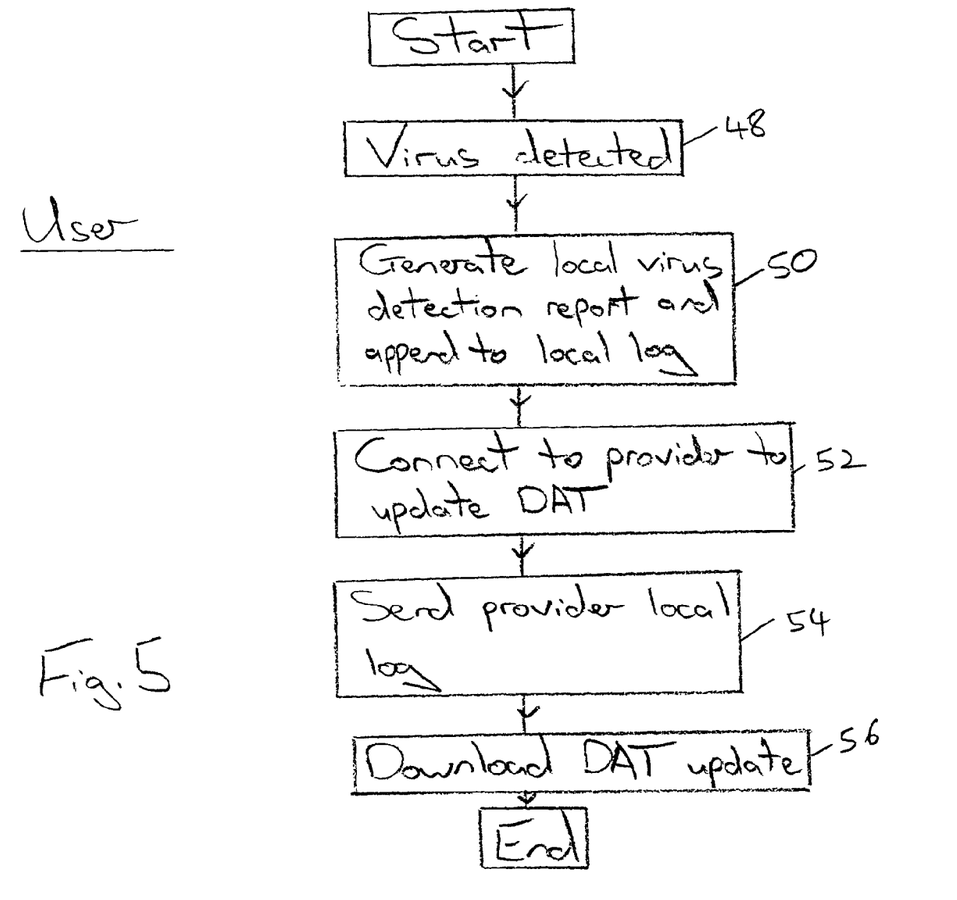
FIGS. 5 and 6 are flow diagrams respectively illustrating the operation of a reporting computer and a receiving computer in accordance with a second embodiment.

FIG. 5 illustrates the action of a reporting computer in accordance with a second embodiment. At step 48 a virus is detected on the reporting computer 2. At step 50 a virus detection report is generated locally within the reporting computer 2 and appended to a local log of such reports held within the reporting computer 2. At step 52, at the same time as an on-demand virus definition data update or a scheduled virus definition data update, the reporting computer 2 establishes a connection to retrieve update data from the receiving computer 6. When this connection has been made, step 54 then serves to send the local log of virus detection reports from the reporting computer 2 to the receiving computer 6. Step 56 downloads the virus definition update data 16 from the receiving computer 6.

The reporting computer 2 in the embodiment of FIG. 5 may be a centralised reporting computer used by all of the client computers on a network to co-ordinate their reporting of virus detection events to the anti-virus software provider. The local log of virus detection events held by this computer may also prove useful to a system administrator in identifying exactly what viruses have been detected within their network, together with when and where these viruses were detected.

Figure 6:
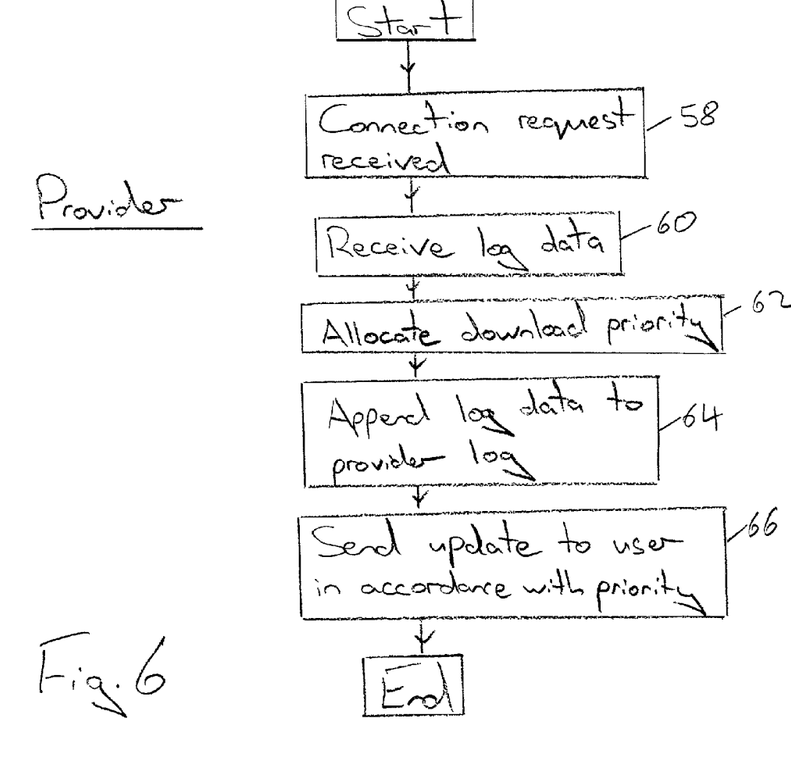

FIG. 6 illustrates the action of the receiving computer 6 in accordance with the second embodiment. At step 58, a connection request is received from the reporting computer 2. This connection request is to download the latest virus definition data 16. At step 60, the receiving computer 6 receives the collated log data that has been generated since the last report from the reporting computer 6 and appends this to its central database of virus detection reports. Step 62 may analyse this virus detection report data to allocate a priority to supplying the updated virus definition data to that particular reporting computer. Accordingly, a reporting computer that sends data indicative of a serious and widespread virus outbreak at that user site may receive a high priority for update download from the anti-virus system provider. Step 64 appends the received virus detection report data to the central log. Step 66 sends the virus definition update data to the reporting computer 2 in accordance with the determined priority.

The virus detection reports should be resistant to tampering and faking. It is important that if virus detection data is to be collected, then this data should be accurate as possible. The encryption of the report data within the URL 20 is one mechanism for protecting this data. The collated report data passed as described in connection with FIGS. 6 and 7 may also be encrypted in a similar manner.

Another way in which the virus detection data may be distorted is if multiple reports of the same virus detection events are received and separately logged. For this reason, the MAC address, date, time, driver identifier and file checksum mentioned above may be used to uniquely identify a virus detection event and accordingly identify duplicates that are reported to the receiving computer 6, such that undesired duplicates may be removed.

Figure 7:
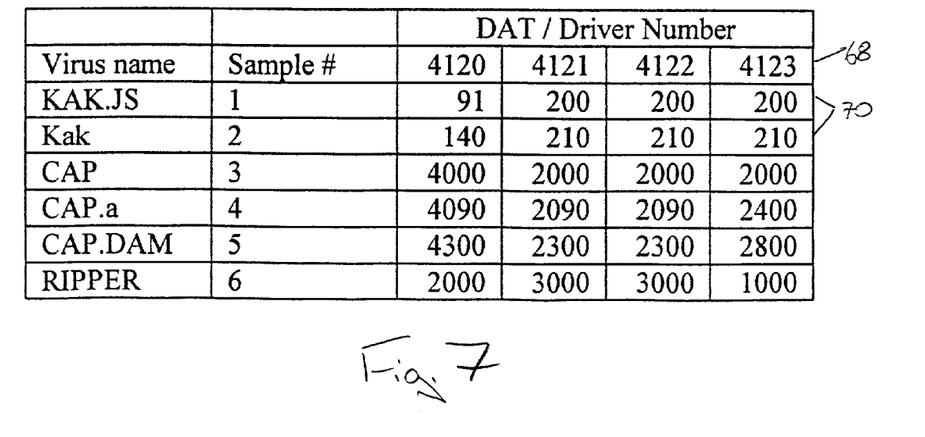
FIG. 7 is a table illustrating the relationship between viruses and the virus driver number for various virus definition libraries.

FIG. 7 illustrates a table illustrating how for four different versions of the virus definition (DAT) data 68, the virus driver 70 triggered on a particular virus detection event may be used to map back to the virus sample number and virus name concerned.

Figure 8:
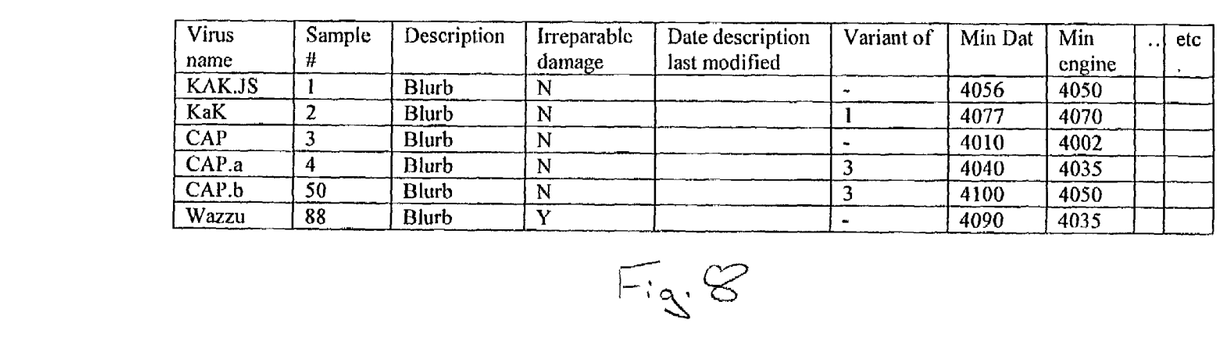
FIG. 8 is a table illustrating various data describing characteristics of certain computer viruses.

Having identified the virus sample with a look up in the table of FIG. 7, the virus description together with other virus characterising information may be looked up in the virus information library 12 using the table as illustrated in FIG. 8.

Figure 9:
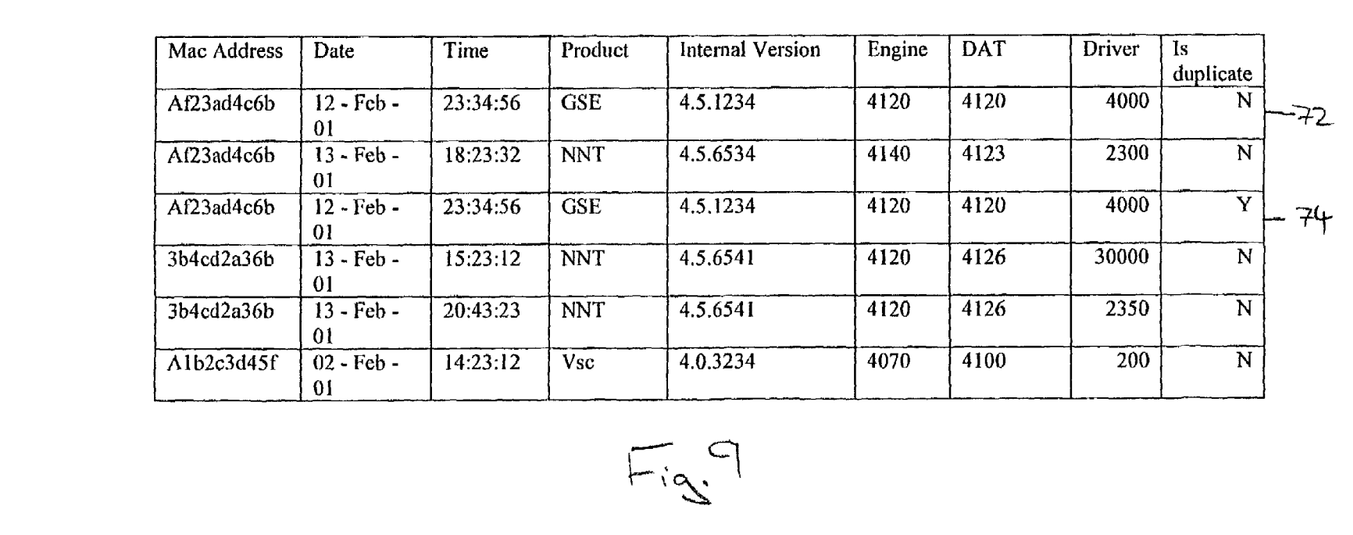
FIG. 9 is a table illustrating a collection of report data relating to various virus detections.

FIG. 9 illustrates a plurality of virus detection event reports. This collection of reports may be part of the database of such reports that is collected within the receiving computer 6, or alternatively might be part of the local collection of such reports made by a reporting computer 2 prior to sending these reports to the receiving computer 6 in accordance with the embodiments of FIGS. 5 and 6. As will be seen from entries 72 and 74 in FIG. 9, entry 74 is a duplicate of entry 72. This may be detected unambiguously by the receiving computer 6 and the entry 74 deleted such that it does not distort the information recovered from the report data.

Figure 10:
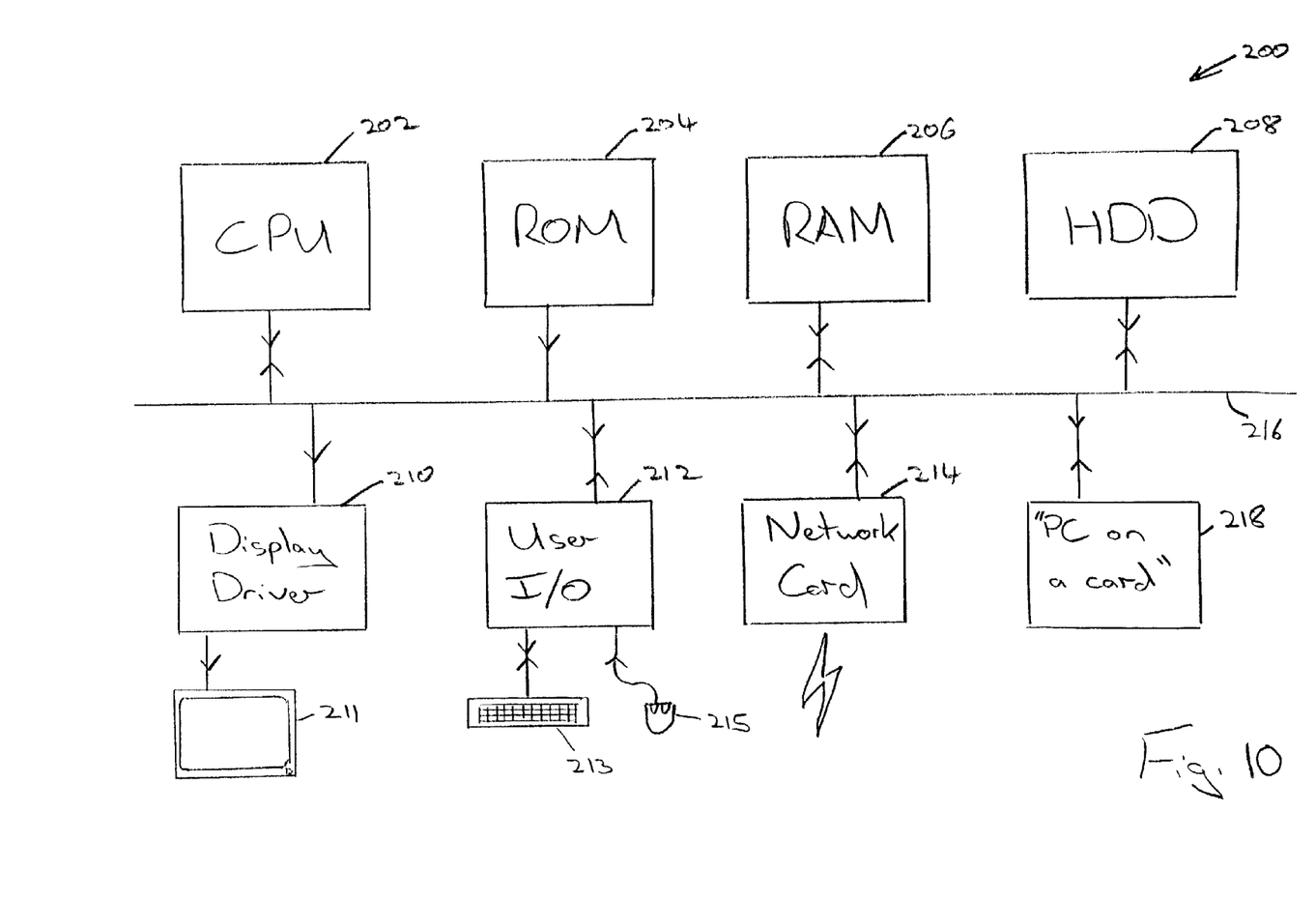
FIG. 10 is a diagram schematically illustrating a general purpose computer that provides one example of a system that may be used to implement the techniques of the invention.

FIG. 10 illustrates a general purpose computer 200 of the type that may be used to perform the above described techniques. The general purpose computer 200 includes a central processing unit 202, a read only memory 204, a random access memory 206, a hard disk drive 208, a display driver 210 with attached display 211, a user input/output circuit 212 with attached keyboard 213 and mouse 215, a network card 214 connected to a network connection and a PC computer on a card 218 all connected to a common system bus 216. In operation, the central processing unit 202 executes a computer program that may be stored within the read only memory 204, the random access memory 206, the hard disk drive 208 or downloaded over the network card 214. Results of this processing may be displayed on the display 211 via the display driver 210. User inputs for triggering and controlling the processing are received via the user input/output circuit 212 from the keyboard 213 and mouse 215. The central processing unit 202 may use the random access 206 as its working memory. A computer program may be loaded into the computer 200 via a recording medium such as a floppy disk drive or compact disk. Alternatively, the computer program may be loaded in via the network card 214 from a remote storage drive. The PC on a card 218 may comprise its own essentially independent computer with its own working memory CPU and other control circuitry that can co-operate with the other elements in FIG. 4 via the system bus 216. The system bus 216 is a comparatively high bandwidth connection allowing rapid and efficient communication.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A computer program product comprising a computer program operable to control a reporting computer to report occurrence of an event to a receiving computer, said computer program comprising:

report generating logic operable to generate report data identifying said reporting computer and said event;

data retrieving logic operable to fetch requested data from said receiving computer to said reporting computer upon a request of said reporting computer; and report sending logic operable to send said report data from said reporting computer to said receiving computer during said fetch of said requested data;

wherein said data retrieving logic and said report sending logic use an interact URL to specify said requested data to said receiving computer, said internet URL specifying said requested data also containing said report data to be sent to said receiving computer;

wherein said report data includes:

an identifier of a set of event detecting data used by a computer program used by said reporting computer to detect said event and a checksum of a file that triggered said event.

2. A computer program product as claimed in claim 1, wherein said event is detection of a computer file containing an unwanted computer program.

3. A computer program product as claimed in claim 2, wherein said unwanted computer program is a computer virus.

4. A computer program product as claimed in claim 1, wherein said requested data is a description of said event.

5. A computer program product as claimed in claim 1, wherein said event is detection of a computer file containing a computer virus and said requested data is a description of said computer virus.

6. A computer prepare product as claimed in claim 1, wherein said event is detection of a computer file containing a computer virus and said requested data is an updated set of computer virus detecting data for use in detecting computer viruses.

7. A computer program product as claimed in claim 1, wherein said reporting computer collates report data specifying one or more events that is sent together from said reporting computer to said receiving computer during said fetch of said requested data.

8. A computer program product as claimed in claim 1, wherein said report data is encrypted by said reporting computer and decrypted by said receiving computer.

9. A computer program product as claimed in claim 1, wherein said reporting computer and said receiving computer communicate via an internet link.

10. A computer program product as claimed in claim 1, wherein said report data further includes one or more of:
 a MAC address identifying a network card of said reporting computer;
 a date of said event;
 a time of said event;
 an identifier of a computer program used by said reporting computer to detect said event;
 an identifier of a version of a computer program used by said reporting computer to detect said event;
 an identifier of an event type detected by said reporting computer; and
 an action taken by said reporting computer upon detection of said event.

11. A computer program product as claimed in claim 1, wherein said report data further includes:
 a MAC address identifying a network card of said reporting computer;
 a date of said event;
 a time of said event;
 an identifier of a computer program used by said reporting computer to detect said event;
 an identifier of a version of a computer program used by said reporting computer to detect said event;
 an identifier of an event type detected by said reporting computer; and
 an action taken by said reporting computer upon detection of said event.

12. A computer program product as claimed in claim 1, wherein said interact URL includes a name of a script running on said receiving computer and encrypted report data.

13. A computer program product as claimed in claim 12, wherein said script decrypts said encrypted report data.

14. A computer program product as claimed in claim 1, wherein said report data includes an identifier of a driver triggered during said event.

15. A computer program claimed in claim 14, wherein said identifier of said driver is mapped to an identity of a virus that triggered mid event.

16. A computer program product as claimed in claim 1, wherein said UR.L is not displayed on said reporting computer.

17. A computer program product as claimed in claim 16, wherein said URL is in the form of a hypertext link that is associated with a description of said event.

18. A computer program product as claimed in claim 17, wherein selection of said hypertext link results in a URL request being passed to said receiving computer.

19. A computer program product comprising a computer program operable to control a receiving computer to receive a report of occurrence of an event from a reporting computer, said computer program comprising:
 data request receiving logic operable to receive a request for requested data from said reporting computer;
 data providing logic operable to provide said requested data to said reporting computer;
 and
 report receiving logic operable to receive report data identifying said reporting computer and said event from said reporting computer during providing of said requested data to said reporting computer;
 wherein said data retrieving logic and said report sending logic use an interact URL to specify said requested data to said receiving computer, said internet URL specifying said requested data also containing said report data to be sent to said receiving computer;
 wherein said report data includes:
  an identifier of a set of event detecting data used by a computer program used by said reporting computer to detect said event and
  a checksum of a file that triggered said event.

20. A computer program product as claimed in claim 19, wherein said event is detection of a computer file containing an unwanted computer program.

21. A computer program product as claimed in claim 20, wherein said unwanted computer program is a computer virus.

22. A computer program product as claimed in claim 19, wherein said requested data is a description of said event.

23. A computer program product as claimed in claim 19, wherein said event is detection of a computer file containing a computer virus and said requested data is a description of said computer virus.

24. A computer program product as claimed in claim 19, wherein said event is detection of a computer file containing a computer virus and said requested data is an updated set of computer virus detecting data for use in detecting computer viruses.

25. A computer program product as claimed in claim 19, wherein said report data specifies one or more events and is sent together from said reporting computer to said receiving computer during providing of said requested dam.

26. A computer program product as claimed in claim 19, wherein said report data is encrypted by said reporting computer and decrypted by said receiving computer.

27. A computer program product as claimed in claim 19, wherein said reporting computer and said receiving computer communicate via an internet link.

28. A computer program product as claimed in claim 19, wherein said report data further includes one or more of:
 a MAC address identifying a network card of said reporting computer;
 a date of said event;
 a time of said event;
 an identifier of a computer program used by said reporting computer to detect said event;
 an identifier of a version of a computer program used by said reporting computer to detect said event;
 an identifier of an event type detected by said reporting computer; and
 an action taken by said reporting computer upon detection of said event.

29. A method of controlling a reporting computer to report occurrence of an event to a receiving computer, said method comprising the steps of:
  generating report data identifying said reporting computer and said event;
  fetching requested data from said receiving computer to said reporting computer upon a request of said reporting computer; and
  sending said report data from said reporting computer to said receiving computer during fetching of said requested data;
  wherein an interact URL is used to specify said requested data to said receiving computer, said internet URL specifying said requested data also containing said report data to be sent to said receiving computer;
  wherein said report data includes:
    an identifier of a set of event detecting data used by a computer program used by said reporting computer to detect said event and
    a checksum of a file that triggered said event.

30. A method as claimed in claim 29, wherein said event is detection of a computer file containing an unwanted computer program.

31. A method as claimed in claim 30, wherein said unwanted computer program is a computer virus.

32. A method as claimed in claim 29, wherein said requested data is a description of said event.

33. A method as claimed in claim 29, wherein said event is detection of a computer file containing a computer virus and said requested data is a description of said computer virus.

34. A method as claimed in claim 29, wherein said event is detection of a computer file containing a computer virus and said requested data is an updated set of computer virus detecting data for use in detecting computer viruses.

35. A method as claimed in claim 29, wherein said reporting computer collates report data specifying one or more events that is sent together from said reporting computer to said receiving computer during fetching of said requested data.

36. A method as claimed in claim 29, wherein said report data is encrypted by said reporting computer and decrypted by said receiving computer.

37. A method as claimed in claim 29, wherein said reporting computer and said receiving computer communicate via an internet link.

38. A method as claimed in claim 29, wherein said report data further includes one or more of:
  a MAC address identifying a network card of said reporting computer;
  a date of said event;
  a time of said event;
  an identifier of a computer program used by said reporting computer to detect said event;
  an identifier of a version of a computer program used by said reporting computer to detect said event;
  an identifier of an event type detected by said reporting computer; and
  an action taken by said reporting computer upon detection of said event.

39. A method of controlling a receiving computer to receive a report of occurrence of an event from a reporting computer, said method comprising the steps of:
  receiving a request tot requested data from said reporting computer;
  providing said requested data to said reporting computer; and
  receiving report data identifying said reporting computer and said event from said reporting computer during providing of said requested data to said reporting computer;
  wherein an internet URL is used to specify said requested data to said receiving computer, said interact URL specifying said requested data also containing said report data to be sent to said receiving computer;
  wherein said report data includes:
    an identifier of a set of event detecting data used by a computer program used by said reporting computer to detect said event and
    a checksum of a file that triggered said event.

40. A method as claimed in claim 39, wherein said event is detection of a computer file containing an unwanted computer program.

41. A method as claimed in claim 40, wherein said unwanted computer program is a computer virus.

42. A method as claimed in claim 39, wherein said requested data is a description of said event.

43. A method as claimed in claim 39, wherein said event is detection of a computer file containing a computer virus and said requested data is a description of said computer virus.

44. A method as claimed in claim 39, wherein said event is detection of a computer file containing a computer virus and said requested data is an ,updated sot of computer virus detecting data for use in detecting computer viruses.

45. A method as claimed in claim 39, wherein said report data specifies one or more events and is sent together from said reporting computer to said receiving computer during providing of said requested data.

46. A method as claimed in claim 39, wherein said report data is encrypted by said reporting computer and decrypted by said receiving computer.

47. A method as claimed in claim 39, wherein said reporting computer and said receiving computer communicate via an internet link.

48. A method as claimed in claim 39, wherein said report data further includes one or more of:
  a MAC address identifying a network card of said reporting computer;
  a date of said event;
  a time of said event;
  an identifier of a computer program used by said reporting computer to detect said event;
  an identifier of a version of a computer program used by said reporting computer to detect said event;
  an identifier of an event type detected by said reporting computer; and
  an action taken by said reporting computer upon detection of said event.

49. A reporting computer operable to report occurrence of an event to a receiving computer, said reporting computer comprising:
  a report generator operable to generate report data identifying said reporting computer and said event;
  a data retriever operable to fetch requested data from said receiving computer to said reporting computer upon a request of said reporting computer; and
  a report sender operable to send said report data from said reporting computer to said receiving computer during said fetch of said requested data;
  wherein an internet URL is used to specify said requested data to said receiving computer, said interact URL specifying said requested data also containing said report data to be sent to said receiving computer;

wherein said report data includes:
an identifier of a set of event detecting data used by a computer program used by said reporting computer to detect said event and
a checksum of a file that triggered said event.

50. A reporting computer as claimed in claim 49, wherein said event is detection of a computer file containing an unwanted computer program.

51. A reporting computer as claimed in claim 50, wherein said unwanted computer program is a computer virus.

52. A reporting computer as claimed in claim 49, wherein said requested data is a description of said event.

53. A reporting computer as claimed in claim 49, wherein said event is detection of a computer file containing a computer virus and said requested data is a description of said computer virus.

54. A reporting computer as claimed in claim 49, wherein said event is detection of a computer file containing a computer virus and said requested data is an updated set of computer virus detecting data for use in detecting computer viruses.

55. A reporting computer as claimed in claim 49, wherein said reporting computer generates report data specifying one or more events that is sent together from said reporting computer to said receiving computer during said fetch of said requested data.

56. A reporting computer as claimed in claim 49, wherein said report data is encrypted by said reporting computer and decrypted by said receiving computer.

57. A reporting computer as claimed in claim 49, wherein said reporting computer and said receiving computer communicate via an interact link.

58. A reporting computer as claimed in claim 49, wherein said report data further includes one or more of:
a MAC address identifying a network card of said reporting computer;
a date of said event;
a time of said event;
an identifier of a computer program used by said reporting computer to detect said event;
an identifier of a version of a computer program used by said reporting computer to detect said event;
an identifier of an event type detected by said reporting computer; and
an action taken by said reporting computer upon detection of said event.

59. A receiving computer operable to receive a report of occurrence of an event from a reporting computer, said receiving computer comprising:
a data request receiver operable to receive a request for requested data from said reporting computer;
a data provider operable to provide said requested data to said reporting computer; and
a report receiver operable to receive report data identifying said reporting computer and said event from said reporting computer during providing of said requested data to said reporting computer;
wherein an internet URL is used to specify said requested data to said receiving computer, said interact URL specifying said requested data also containing said report data to be sent to said receiving computer;
wherein said report data includes:
an identifier of a set of event detecting data used by a computer program used by said reporting computer to detect said event and
a checksum of a file that triggered said event.

60. A receiving computer as claimed ha claim 59, wherein said event is detection of a computer file containing an unwanted computer program.

61. A receiving computer as claimed in claim 60, wherein said unwanted computer program is a computer virus.

62. A receiving computer as claimed in claim 59, wherein said requested data is a description of said event.

63. A receiving computer as claimed in claim 59, wherein said event is detection of a computer file containing a computer virus and said requested data is a description of said computer virus.

64. A receiving computer as claimed in claim 59, wherein said event is detection of a computer file containing a computer virus and said requested data is an updated set of computer virus detecting data for use in detecting computer viruses.

65. A receiving computer as claimed in claim 59, wherein said report data specifies one or more events and is sent together from said reporting computer to said receiving computer during providing of said requested data.

66. A receiving computer as claimed in claim 59, wherein said report data is encrypted by said reporting computer and decrypted by said receiving computer.

67. A receiving computer as claimed in claim 59, wherein said reporting computer and said receiving computer communicate via an interact link.

68. A receiving computer as claimed in claim 59, wherein said report data further includes one or more of:
a MAC address identifying a network card of said reporting computer;
a date of said event;
a time of said event;
an identifier of a computer program used by said reporting computer to detect said event;
an identifier of a version of a computer program used by said reporting computer to detect said event;
an identifier of an event type detected by said reporting computer; and
an action taken by said reporting computer upon detection of said event.

* * * * *

UNITED STATES PATENT AND TRADEMARK OFFICE
CERTIFICATE OF CORRECTION

PATENT NO.         : 7,228,565 B2                                              Page 1 of 1
APPLICATION NO.    : 09/854492
DATED              : June 5, 2007
INVENTOR(S)        : Wolff et al.

It is certified that error appears in the above-identified patent and that said Letters Patent is hereby corrected as shown below:

Col. 6, line 51, replace "interact" with -- internet --;
Col. 7, line 62, replace "UR.L" with -- URL --;
Col. 8, line 18, replace "interact" with -- internet --;
Col. 8, line 47, replace "dam" with -- data --;
Col. 9, line 12, replace "interact" with -- internet --;
Col. 9, line 64, replace "tot" with -- for --;
Col. 10, line 6, replace "interact" with -- internet --;
Col. 10, line 27, replace "an .updated sot" with -- an updated set --;
Col. 11, line 32, replace "interact" with -- internet --;
Col. 12, line 4, replace "interact" with -- internet --;
Col. 12, line 12, replace "ha" with -- in --;
Col. 12, line 38, replace "interact" with -- internet --.

Signed and Sealed this
First Day of March, 2011

David J. Kappos
*Director of the United States Patent and Trademark Office*